United States Patent
Seo

(10) Patent No.: US 10,230,075 B2
(45) Date of Patent: Mar. 12, 2019

(54) RECHARGEABLE BATTERY HAVING INSULATING MEMBER

(71) Applicant: Samsung SDI Co., Ltd., Yongin-si, Gyeonggi-do (KR)

(72) Inventor: Kwang-Sik Seo, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 140 days.

(21) Appl. No.: 14/832,914

(22) Filed: Aug. 21, 2015

(65) Prior Publication Data

US 2016/0056423 A1 Feb. 25, 2016

(30) Foreign Application Priority Data

Aug. 25, 2014 (KR) .......................... 10-2014-0111016

(51) Int. Cl.
*H01M 2/04* (2006.01)
*H01M 2/06* (2006.01)
*H01M 10/0525* (2010.01)

(52) U.S. Cl.
CPC ....... *H01M 2/0482* (2013.01); *H01M 2/0456* (2013.01); *H01M 2/06* (2013.01); *H01M 10/0525* (2013.01)

(58) Field of Classification Search
CPC ........... H01M 10/0525; H01M 2/0456; H01M 2/0482; H01M 2/06
See application file for complete search history.

(56) References Cited

U.S. PATENT DOCUMENTS

| | | | |
|---|---|---|---|
| 2006/0073382 A1* | 4/2006 | Urano | H01M 2/0404 429/161 |
| 2006/0269838 A1* | 11/2006 | Song | H01M 2/0404 429/174 |
| 2010/0233528 A1* | 9/2010 | Kim | H01M 2/043 429/178 |
| 2013/0011699 A1* | 1/2013 | Kim | H01H 85/36 429/7 |
| 2014/0272548 A1* | 9/2014 | Woo | H01M 2/0404 429/174 |

FOREIGN PATENT DOCUMENTS

KR 10-2008-0096164 A 10/2008
KR 10-2014-0019927 A 2/2014

* cited by examiner

*Primary Examiner* — Lingwen R Zeng
(74) *Attorney, Agent, or Firm* — Knobbe Martens Olson & Bear LLP

(57) ABSTRACT

A rechargeable battery having an insulating member is disclosed. In one aspect, the battery includes an electrode assembly including a first electrode, a second electrode, and a separator interposed between the first and second electrodes. The battery also includes a storage case housing the electrode assembly. An opening is formed in the storage case. The battery further includes a cap plate attached to the opening of the storage case, a terminal penetrating through the cap plate, and a connection plate electrically connecting the terminal to the second electrode. The battery also includes an insulating member interposed between the cap plate and the connection plate. The insulating member includes a base plate contacting a bottom surface of the cap plate and a supporting rib that protrudes from the base plate and contacts an inner surface of the storage case.

15 Claims, 5 Drawing Sheets

RECHARGEABLE BATTERY HAVING INSULATING MEMBER

CROSS-REFERENCE TO RELATED APPLICATION

This application claims priority to and the benefit of Korean Patent Application No. 10-2014-0111016 filed in the Korean Intellectual Property Office on Aug. 25, 2014, the entire contents of which are incorporated herein by reference.

BACKGROUND

Field

The described technology generally relates to a rechargeable battery having an insulating member.

Description of the Related Technology

Rechargeable batteries differ from primary batteries in that they can be repeatedly charged and discharged, while the latter are incapable of being recharged.

Low-capacity rechargeable batteries are used in small portable electronic devices such as mobile phones, notebook computers, and camcorders, while high-capacity rechargeable batteries are used as the power source for driving a motor of hybrid or electric vehicles and the like.

A number of standard rechargeable battery technologies exist including nickel-cadmium (Ni—Cd) batteries, nickel-hydrogen (Ni—MH) batteries, lithium (Li) batteries, lithium ion (Li-ion) rechargeable batteries, etc. Lithium ion rechargeable batteries have an operating voltage that is about three times higher than that of Ni—Cd or Ni—MH batteries and consequently are widely used as the power supplies for a variety of electronic devices.

In addition, lithium ion rechargeable batteries are in wide use partially due to their high energy density per unit weight. In the standard rechargeable Li-ion battery, a lithium-based oxide can been used as a positive active material and a carbon material can been used as a negative active material.

Generally, batteries can be classified into liquid electrolyte batteries and polymer electrolyte batteries depending on the type of electrolyte employed. Lithium batteries which use a liquid electrolyte are called lithium ion batteries while batteries using a polymer electrolyte are called lithium polymer batteries.

SUMMARY OF CERTAIN INVENTIVE ASPECTS

One inventive aspect is a rechargeable battery having a high energy density per unit volume and having sufficient insulation between electrodes thereof.

Another aspect is a rechargeable battery, including: an electrode assembly having a first electrode, a second electrode, and a separator interposed between the first and second electrodes; a storage case having a space for accommodating the electrode assembly; a cap plate combined to an opening formed in the storage case; a terminal installed to penetrate the cap plate; a connection plate for electrically connecting the terminal and the second electrode; and an insulating member installed between the cap plate and the connection plate. The insulating member includes a base plate contacting a bottom surface of the cap plate and supporting ribs protruding from the base plate to contact an inner side of the storage case.

The supporting rib may be formed to be elongated along a side end of the base plate, a first tab may be installed in the cap plate, a second tab may be installed in the connection plate, the first tab may be electrically connected to the first electrode, and the second tab may be electrically connected to the second electrode.

A cutout may be formed in the insulating member, the first tab may penetrate the cutout to be fixed to the cap plate by welding, and the cutout may be formed to be elongated from the base plate to the supporting rib.

A groove may be formed in the rib, the groove may be formed to face the second tab, a fixing protrusion may be formed in the cap plate to protrude toward the base plate, and a fixing hole into which the fixing protrusion may be inserted is formed in the base plate.

A hole through which the terminal penetrates may be formed in the base plate and the connection plate, an electrolyte solution injection hole may be formed in the cap plate, and a coupling hole may be formed in the base plate to be connected to the electrolyte solution injection hole.

A height of the supporting rib formed at each end portion of the base plate in a length direction thereof may be formed to be lower than that of an inner part of the supporting rib, rounded portions may be formed to have an arc shape at opposite end portions of the base plate in a length direction thereof, and the height of the supporting rib at the rounded portions may be formed to be lower than that of an inner part of the supporting rib.

Supporting protrusions may be formed in the base plate to protrude to face each other and the connection plate may be arranged between the supporting protrusions.

Another aspect is a rechargeable battery comprising an electrode assembly including a first electrode, a second electrode, and a separator interposed between the first and second electrodes; a storage case housing the electrode assembly, wherein an opening is formed in the storage case; a cap plate attached to the opening of the storage case; a terminal penetrating through the cap plate; a connection plate electrically connecting the terminal to the second electrode; and an insulating member interposed between the cap plate and the connection plate, wherein the insulating member includes i) a base plate contacting a bottom surface of the cap plate and ii) a supporting rib that protrudes from the base plate and contacts an inner surface of the storage case.

In certain embodiments, the base plate is elongated in one direction and wherein the supporting rib is formed along the elongated sides of the base plate. The rechargeable battery can further comprise a first tab electrically connected to the cap plate and the first electrode; and a second tab electrically connected to the connection plate and the second electrode. A cutout can be formed in the insulating member and the first tab can penetrate through the cutout and is welded to the cap plate. The cutout can be formed to be elongated from the base plate to the supporting rib. A groove can be formed in the rib and the groove can face the second tab.

In certain embodiments, the cap plate includes a fixing protrusion protruding toward the base plate, wherein a fixing hole is formed in the base plate and wherein the fixing protrusion is inserted into the fixing hole. A terminal hole can be formed in each of the base plate and the connection plate and the terminal can penetrate through the base plate and the connection plate via the terminal holes. An electrolyte solution injection hole can be formed in the cap plate, a coupling hole can be formed in the base plate, and the coupling hole can be aligned with the electrolyte solution injection hole. The base plate can be elongated in one direction so at to have two opposing ends, the heights of the supporting rib formed at each of the ends of the base plate can be less than that of the remaining portions of the supporting rib. The ends of the base plate can be rounded to have an arc shape. The insulating member can further comprise a pair of supporting protrusions protruding from the base plate and facing each other and the connection plate can be arranged between the supporting protrusions.

Another aspect is a rechargeable battery comprising an electrode assembly; a storage case housing the electrode assembly; a cap plate sealing a receivable opening of the storage case and electrically connected to the electrode assembly; a connection plate electrically connected to the electrode assembly; and an insulating member comprising: i) a base plate interposed between the cap plate and the connection plate and ii) a supporting rib that protrudes from the edges of the base plate towards the electrode assembly.

In certain embodiments, an outer surface of the supporting rib contacts the storage case. The insulating member can further comprise a pair of supporting protrusions protruding from the base plate towards the electrode assembly and the connection plate can be arranged between the supporting protrusions.

According to at least one embodiment, the insulating member is arranged between the connection plate and the cap plate and the supporting rib is formed in the insulating member, the volume of the structure above the electrode assembly can be minimized, and a greater amount of electrolyte solution can be injected into the storage case.

In addition, since the supporting rib is formed in the insulating member, the cap plate and the storage case can be securely attached to each other.

In addition, since the height of the supporting rib formed at each end portion of the supporting member in the length direction thereof is formed to be less than that of the inner part of the supporting rib, the effect of impacts can be reduced when longitudinal impacts are delivered to the storage case.

DETAILED DESCRIPTION OF CERTAIN INVENTIVE EMBODIMENTS

Figure 1:
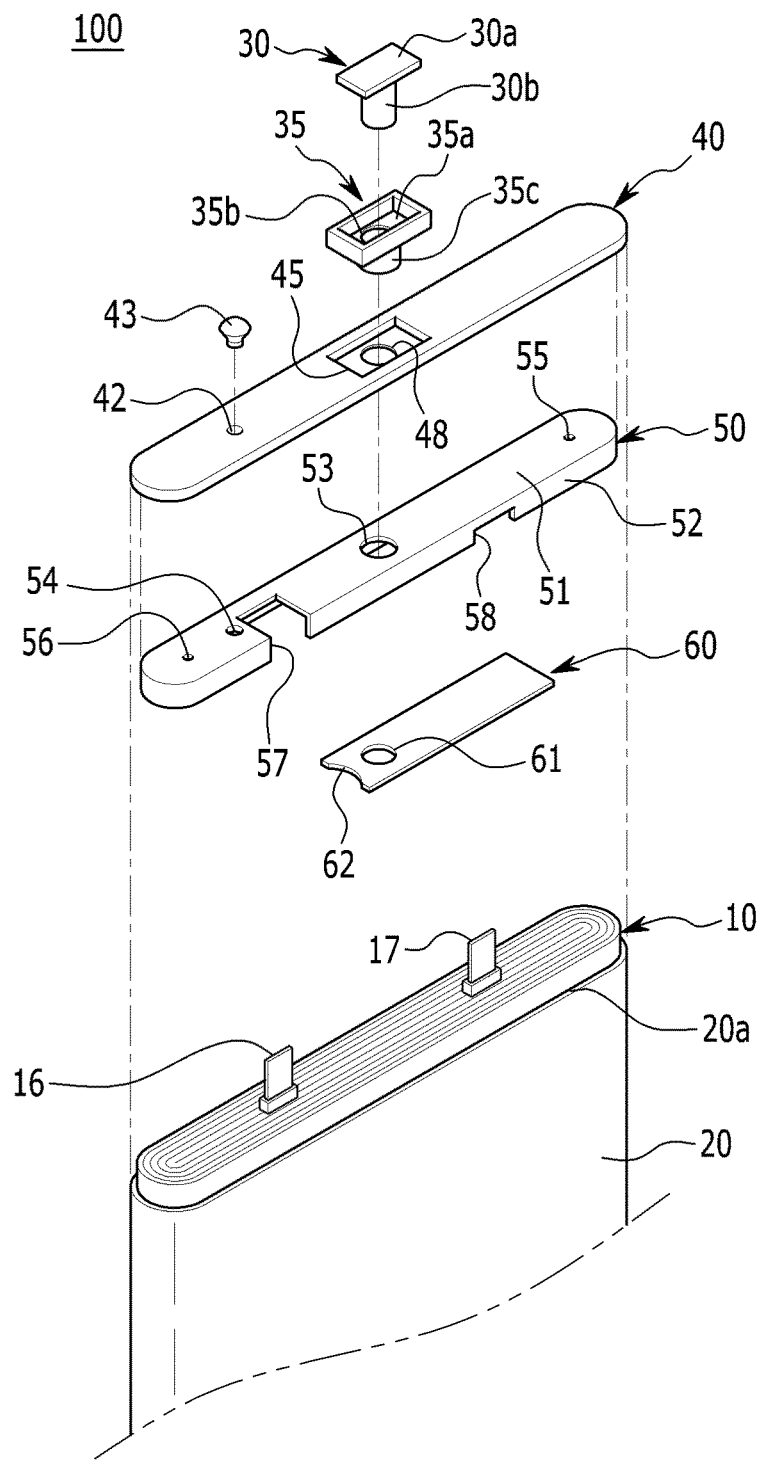
FIG. 1 is an exploded perspective view of a rechargeable battery according to a first exemplary embodiment.

It can be important for rechargeable batteries to have high energy density per volume. One method of increasing the energy density of a rechargeable battery includes simplifying the structure of the cap plate assembly.

In addition to having a simplified structure, the cap plate and a storage case should be securely attached to each other so as to provide a measure of safety against external impacts.

The described technology will be described more fully hereinafter with reference to the accompanying drawings, in which exemplary embodiments are shown.

As those skilled in the art would realize, the described embodiments may be modified in various different ways, all without departing from the spirit or scope of the described technology.

In addition, like reference numerals designate like elements throughout the specification and the drawings.

Figure 2:
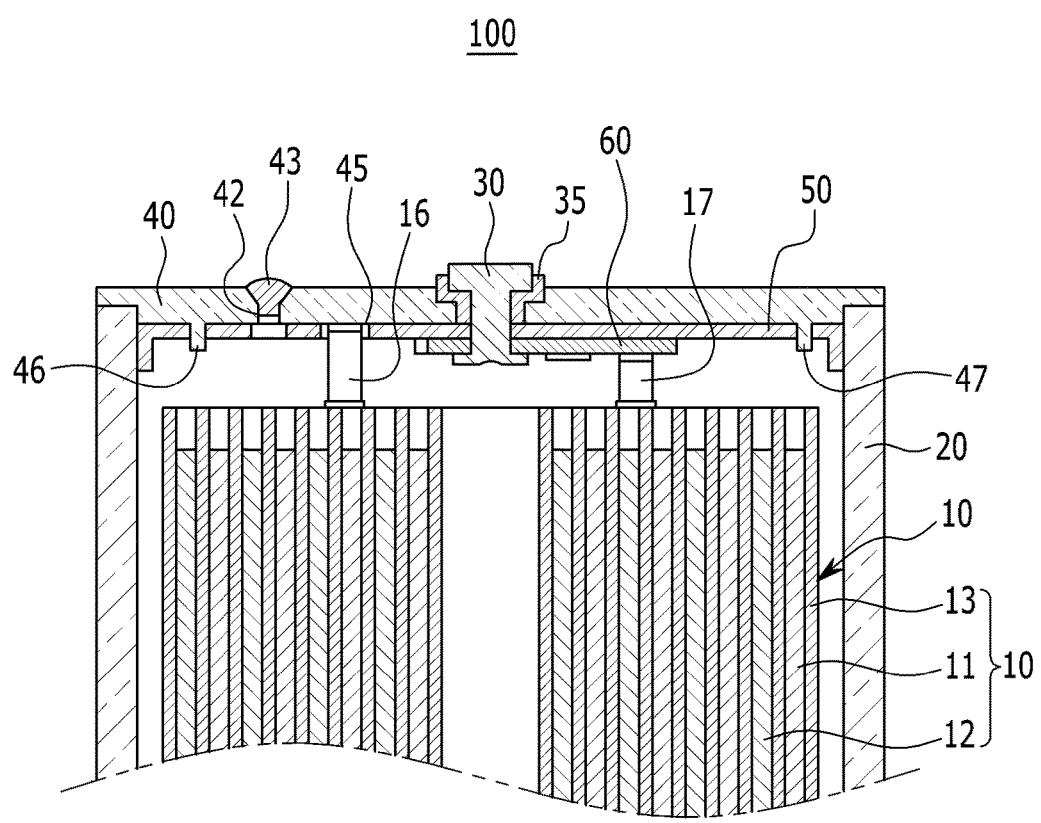
FIG. 2 is a cross-sectional view of the rechargeable battery according to the first exemplary embodiment.

FIG. 1 is an exploded perspective view of a rechargeable battery according to a first exemplary embodiment. FIG. 2 is a cross-sectional view of the rechargeable battery according to the first exemplary embodiment.

Referring to FIGS. 1 and 2, the rechargeable battery 100 includes an electrode assembly 10, a storage case 20, an insulating member 50, a connection plate 60, and a cap plate 40.

In the following description, a prismatic lithium ion rechargeable battery will be described as an example, but the described technology is not limited thereto, and may be applicable to various types of batteries such as a pouch battery, a lithium polymer battery, and the like.

The electrode assembly 10 includes a positive electrode (first electrode) 11, a negative electrode (second electrode) 12, and a separator 13 interposed between the positive and negative electrodes 11 and 12.

The positive electrode 11 is formed to have a long strip shape and includes a positive electrode coated region where a positive electrode active material layer is formed and a positive electrode uncoated region where an active material is not coated.

The positive electrode uncoated region is located at one end portion of the positive electrode 11 along a length direction thereof.

The negative electrode 12 is formed to have a long strip shape and includes a negative electrode coated region where a negative electrode active material layer is formed and a negative electrode uncoated region where an active material is not coated.

The negative uncoated region is located at one end portion of the negative electrode 12 along a length direction thereof.

The positive and negative electrodes 11 and 12 are arranged such that the separator 13 acting as an insulator is interposed therebetween and are then wound together in a jelly-roll form.

However, the described technology is not limited thereto, and the electrode assembly may have a structure in which the positive electrode, the separator, and the negative electrode are sequentially laminated.

A positive electrode tab (first tab) 16 is fixedly installed in the positive electrode 11 while a negative electrode tab (second tab) 17 is fixedly installed in the negative electrode 12.

The positive and negative electrode tabs 16 and 17 are arranged to be parallel with a winding axis of the electrode assembly 10 and are installed to protrude from a cross-sectional portion of the electrode assembly 10 where layers thereof are exposed.

The positive and negative electrode tabs 16 and 17 protrude toward an opening formed in the storage case 20 and are arranged such that they are separated and electrically insulated from each other.

The positive electrode tab 16 is formed of an electrically conductive material such as nickel and/or aluminum and is electrically connected to the cap plate 40.

The negative electrode tab 17 is formed of an electrically conductive material such as copper and/or nickel and is electrically connected to a terminal 30.

An opening 20a is formed at an upper end of the storage case 20 to accommodate the electrode assembly 10 and opposing ends of the storage case 20 are formed in the shape of a rounded pillar.

The storage case 20 provides a space for accommodating the electrode assembly 10 and an electrolyte solution and is electrically connected to the positive electrode tab 16 through the cap plate 40.

The storage case 20 may be produced by processing aluminum or an aluminum alloy using a method such as metal deep drawing.

The cap plate 40 is attached to the opening 20a of the storage case 20 to seal the storage case 20 and is formed of an electrically conductive metallic material such as aluminum or an aluminum alloy.

The positive electrode tab 16 is bonded to a bottom surface of the cap plate 40 by welding to positively charge the cap plate 40.

A terminal groove 45 is formed in the cap plate 40 and accommodates the terminal 30. A terminal hole 48 is formed at a center of the terminal groove 45.

The terminal groove 45 has a substantially quadrangular cross-section and a head 30a of the terminal 30 is inserted into the terminal groove 45.

The terminal hole 48 is formed at a center of the cap plate 40 and a pillar portion or body 30b is inserted into the terminal hole 48.

The terminal 30 is installed in the terminal groove 45 and the terminal hole 48 through an insulating gasket 35.

In addition, an electrolyte solution injection hole 42 is formed in the cap plate 40 and the electrolyte solution is injected into the storage case 20 via the electrolyte solution injection hole 42.

A cap 43 is installed in the electrolyte solution injection hole 42 such that it closes and seals the electrolyte solution injection hole 42.

The terminal 30 includes the head 30a and the pillar portion 30b fixed to the head 30a.

The head 30a has a substantially quadrangular plate shape and has a wider cross-sectional area than the pillar portion 30b.

The pillar portion 30b has a substantially cylindrical shape and is inserted into the terminal hole 48.

The terminal 30 is installed to penetrate the cap plate 40, the insulating member 50, and the connection plate 60 such that it is fixed to the cap plate 40 by riveting after being inserted into the cap plate 40.

A groove 35a into which the head 30a is inserted is formed in the insulating gasket 35 and a hole 35b through which the pillar portion 30b is inserted is formed at a center of the insulating gasket 35.

The insulating gasket 35 prevents the terminal 30 and the cap plate 40 from directly contacting each other and is formed of a polymer having an insulating property.

Figure 3:
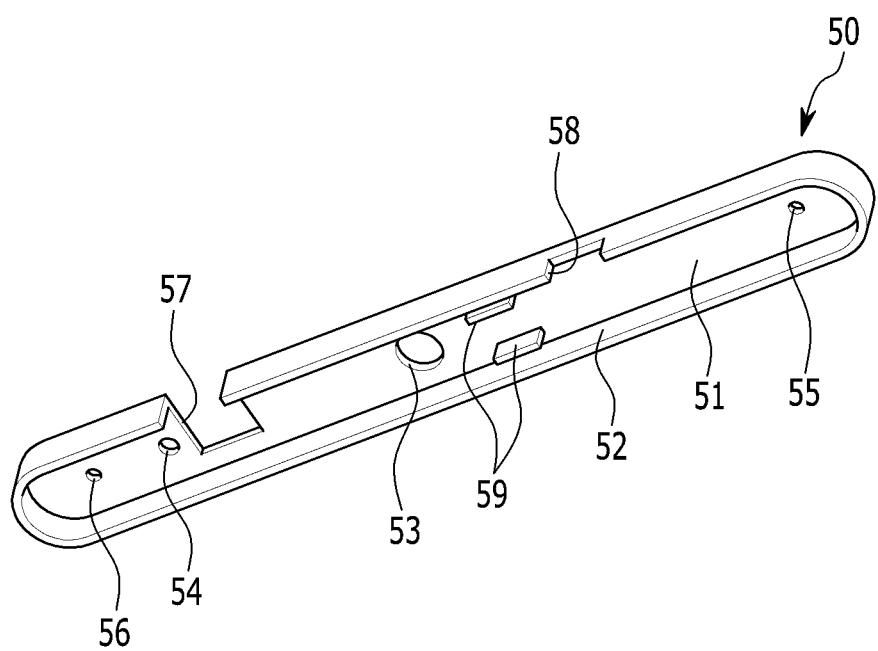
FIG. 3 is a perspective view of an insulating member according to the first exemplary embodiment as viewed from the bottom.
Figure 4:
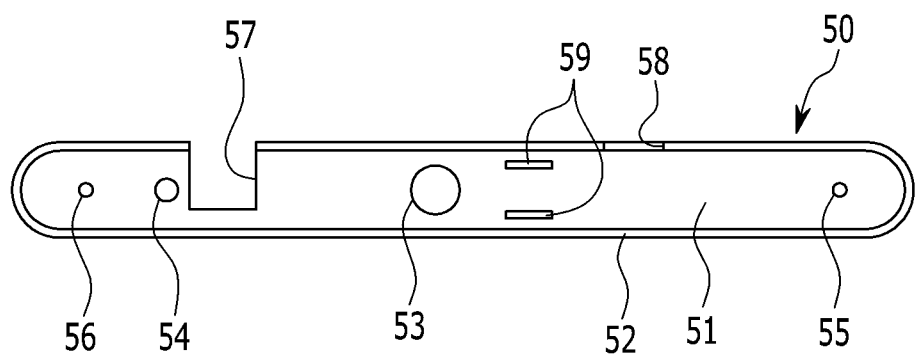
FIG. 4 is a bottom view of the insulating member according to the first exemplary embodiment.

FIG. 3 is a perspective view of an insulating member according to the first exemplary embodiment as viewed from the bottom. FIG. 4 is a bottom view of the insulating member according to the first exemplary embodiment.

Referring to FIGS. 3 and 4, the insulating member 50 is installed under the cap plate 40 to insulate the connection plate 60 from the cap plate 40.

The insulating member 50 includes a base plate 51 that contacts the bottom surface of the cap plate 40 and a supporting rib 52 that protrudes from the base plate 51 and contacts an inner side of the storage case 20.

The base plate 51 is arranged parallel to the cap plate 40 and is fixed to the bottom surface of the cap plate 40.

The base plate 51 has a plate shape that is elongated in one direction, opposing end portions of which are formed to be rounded in a length direction of the base plate 51.

Fixing protrusions 46 and 47 are formed to protrude toward the base plate 51 from the bottom surface of the cap plate 40 and fixing holes 55 and 56 into which the fixing protrusions 46 and 47 are inserted are formed in the base plate 51.

The fixing protrusions 46 and 47 are formed at opposing lateral edges of the cap plate 40 in a length direction thereof and the fixing holes 55 and 56 are formed under the fixing protrusions 46 and 47.

The fixing protrusions 46 and 47 are inserted into the fixing holes 55 and 56 to be combined therewith, thereby securely fixing the base plate 51 to the cap plate 40.

Meanwhile, the base plate 51 has a hole or terminal hole 53 through which the terminal 30 penetrates and a coupling hole 54 that is formed under the electrolyte solution injection hole 42 to be connected thereto. Accordingly, the coupling hole 54 is aligned with the electrolyte solution injection hole 42.

The supporting rib 52 is formed along the sides of the base plate 51 and protrudes toward the electrode assembly 10.

The supporting rib 52 is tightly attached to the inner side of the storage case 20 to securely support the cap plate 40 and the insulating member 50 inside the storage case 20.

In some embodiments, the supporting rib 52 has a lower end portion that is slantedly formed toward the inside of the storage case 20, such that it is easily inserted therein.

A cutout 57 is formed in the insulating member 50 and the cutout 57 is formed to be elongated from the base plate 51 to the supporting rib 52 that is formed at one lateral side.

The cutout 57 is formed such that it is adjacent to the positive electrode tab 16 and the positive electrode tab 16 penetrates the cutout 57 to be fixed to the cap plate 40 by welding.

In addition, a groove 58 is formed in the supporting rib 52 and the groove 58 is formed to face the negative electrode tab 17.

The cap plate 40 is arranged substantially perpendicular to the positive and negative electrode tabs 16 and 17. The positive electrode tab 16 is welded to the cap plate 40 and the negative electrode tab 17 is welded to the connection plate 60.

In order to be welded as described above, the positive electrode tab 16 is inserted into the cutout 57 and the negative electrode tab 17 is arranged adjacent to the groove 58.

When the cap plate 40 is attached to the storage case 20, the positive and negative electrode tabs 16 and 17 are bent such that they are arranged inside of the supporting rib 52.

When the cutout 57 and the groove 58 are formed as described above, the positive and negative electrode tabs 16 and 17 can be more easily welded.

Two supporting protrusions 59 separated from each other in the width direction of the base plate 51 are formed under the base plate 51.

The connection plate 60 is inserted between the supporting protrusions 59 and the supporting protrusions 59 contact an external surface of the connection plate 60 to support the connection plate 60.

The connection plate 60 can be rotated with respect to the terminal 30 or may be moved due to impacts.

When the connection plate 60 is moved, contact between the terminal 30 and the connection plate 60 may be interrupted or the connection plate 60 and the storage case may be short-circuited.

However, when the supporting protrusions 59 are formed as in the present exemplary embodiment, they can stably support the connection plate 60 to prevent excessive movement of the connection plate 60.

Meanwhile, the connection plate 60 is arranged under the insulating member 50 and the connection plate 60 is fixed to the cap plate 40 by the terminal 30.

The connection plate 60 has a plate shape that is elongated in one direction. A hole or terminal hole 61 through which the terminal 30 penetrates is formed in the connection plate 60.

In addition, a groove 62 having a curved an arc shape is formed at a first end of the connection plate.

The connection plate 60 is arranged parallel to the cap plate 40 and the negative electrode tab 17 is fixed to the bottom surface of the connection plate 60 by welding.

Accordingly, the terminal 30 is electrically connected to the negative electrode 12 through the connection plate 60 and the negative electrode tab 17.

As in the present exemplary embodiment, when the insulating member 50 is arranged between the cap plate 40 and the connection plate 60 and the supporting rib 52 is formed in the insulating member 50, the thickness of the structure connected to the cap plate 40 can be reduced and thus a greater amount of electrolyte solution can be injected into the storage case 20.

When the amount of the electrolyte solution injected into the storage case 20 is increased, the capacity of the rechargeable battery 100 can be improved.

In addition, due to the inclusion of the supporting rib 52, the functionality of the standard insulating case can be replicated by the insulating member 50, thereby reducing the manufacturing cost as well as improving structural stability.

Figure 5:
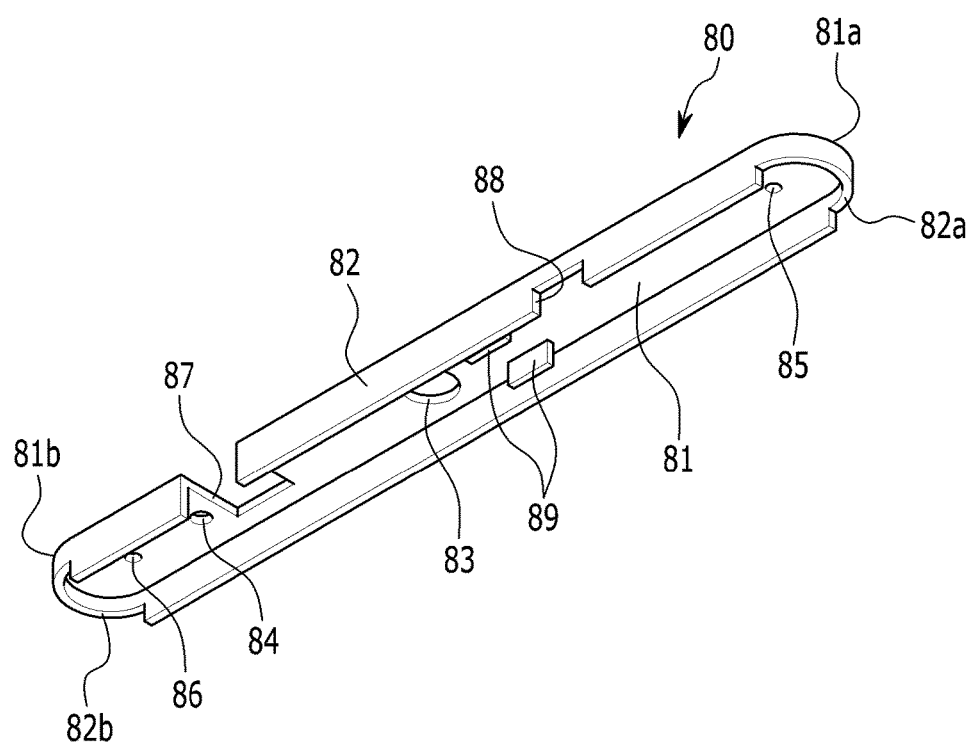
FIG. 5 is a perspective view of an insulating member according to a second exemplary embodiment as viewed from the bottom.

FIG. 5 is a perspective view of an insulating member according to a second exemplary embodiment.

Referring to FIG. 5, an insulating member 80 includes a base plate 81 that contacts the bottom surface of the cap plate 40 and a supporting rib 82 that protrudes from the base plate 81 to contact the inner side of the storage case 20.

The base plate 81 is arranged parallel to the cap plate 40 and is fixed to the bottom surface of the cap plate 40.

The base plate 81 has a plate shape that is elongated in one direction, rounded portions of which are formed at opposing end portions in a length direction thereof.

Fixing holes 85 and 86 into which the fixing protrusions 46 and 47 are inserted are formed in the base plate 81 and the fixing holes 85 and 86 are formed at opposing edges of the base plate 81 in the length direction thereof.

The base plate 81 is formed with a hole 83 through which the terminal 30 penetrates and a coupling hole 84 that is formed under the electrolyte solution injection hole 42 to be connected thereto.

The supporting rib 82 is formed along the sides of the base plate 81 and protrudes toward the electrode assembly 10.

The supporting rib 82 is tightly attached to the inner side of the storage case 20 to securely support the cap plate 40 and the insulating member 80 inside the storage case 20.

A cutout 87 is formed in the insulating member 80 and the cutout 87 is formed to be elongated from the base plate 81 to the supporting rib 82 that is formed at one lateral side.

In addition, a groove 88 is formed in the supporting rib 82 and the groove 88 is formed to face the negative electrode tab 17.

Two supporting protrusions 89 separated from each other in a width direction of the base plate 81 are formed under the base plate 81.

The connection plate 60 is inserted between the supporting protrusions 89 and the supporting protrusions 89 contact an external surface of the connection plate 60 to support the connection plate 60.

A first avoidance groove 82a is formed in the supporting rib 82 that protrudes from a rounded portion 81a formed at one end portion of the base plate 81 in a length direction thereof. Similarly, a second avoidance groove 82b is formed in the supporting rib 82 that protrudes from the rounded portion 81b formed at the other end portion of the base plate 81 in a length direction thereof.

Due to the avoidance grooves 82a and 82b, the height of the supporting rib 82 protruding from each rounded portion 81a and 81b is less than that of the remaining portions of the supporting rib 82.

That is, the height of the supporting rib 82 formed at each end portion of the base plate 81 in the length direction thereof is less than that of the supporting rib 82 formed at the inner portions of the supporting rib 82.

As described above, when the height of the supporting rib 82 is formed to be lower at each end portion of the base plate 81 in the length direction thereof and the side end of the storage case 20 receives external impacts, the rounded portions can be deformed to absorb the impacts.

When longitudinal compression is performed and thus the impacts are directly delivered to the inside of the rechargeable battery, the terminal 30 may be broken, causing internal short-circuits.

When an internal short-circuit occurs, a dangerous situation may arise due to the short-circuit current formed. However, when the rounded portions absorb the impacts, impact resistance of the rechargeable battery is improved.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A rechargeable battery, comprising:
   an electrode assembly including a first electrode, a second electrode, and a separator interposed between the first and second electrodes;
   a storage case housing the electrode assembly, wherein an opening is formed in the storage case;
   a cap plate attached to the opening of the storage case;
   a terminal penetrating through the cap plate;
   a connection plate electrically connecting the terminal to the second electrode; and
   an insulating member interposed between the cap plate and the connection plate, wherein the insulating member includes i) a base plate contacting a bottom surface of the cap plate, ii) a supporting rib that protrudes from the base plate and contacts an inner surface of the storage case, and (iii) a pair of supporting protrusions separated from and facing each other in a width direction of the base plate, the supporting protrusions protruding from the base plate toward the electrode assembly, wherein the connection plate is arranged between and in direct contact with both of the supporting protrusions, and wherein each supporting protrusion fixes the connection plate inside the supporting rib.
2. The rechargeable battery of claim 1, wherein the base plate is elongated in one direction and wherein the supporting rib is formed along the elongated sides of the base plate.

3. The rechargeable battery of claim 1, further comprising:
- a first tab electrically connected to the cap plate and the first electrode; and
- a second tab electrically connected to the connection plate and the second electrode.

4. The rechargeable battery of claim 3, wherein a cutout is formed in the insulating member and wherein the first tab penetrates through the cutout and is welded to the cap plate.

5. The rechargeable battery of claim 4, wherein the cutout is formed to be elongated from the base plate to the supporting rib.

6. The rechargeable battery of claim 3, wherein a groove is formed in the supporting rib and wherein the groove faces the second tab.

7. The rechargeable battery of claim 1, wherein the cap plate includes a fixing protrusion protruding toward the base plate, wherein a fixing hole is formed in the base plate, and wherein the fixing protrusion is inserted into the fixing hole.

8. The rechargeable battery of claim 1, wherein a terminal hole is formed in each of the base plate and the connection plate and wherein the terminal penetrates through the base plate and the connection plate via the terminal holes.

9. The rechargeable battery of claim 1, wherein an electrolyte solution injection hole is formed in the cap plate, wherein a coupling hole is formed in the base plate, and wherein the coupling hole is aligned with the electrolyte solution injection hole.

10. The rechargeable battery of claim 1, wherein the base plate is elongated in one direction so at to have two opposing ends, wherein the heights of the supporting rib formed at each of the ends of the base plate are less than that of the remaining portions of the supporting rib.

11. The rechargeable battery of claim 10, wherein the ends of the base plate are rounded to have an arc shape.

12. A rechargeable battery, comprising:
- an electrode assembly;
- a storage case housing the electrode assembly;
- a cap plate sealing a receivable opening of the storage case and electrically connected to the electrode assembly;
- a connection plate electrically connected to the electrode assembly; and
- an insulating member comprising: i) a base plate interposed between the cap plate and the connection plate, ii) a supporting rib that protrudes from the edges of the base plate towards the electrode assembly, and (iii) a pair of supporting protrusions separated from and facing each other in a width direction of the base plate, the supporting protrusions protruding from the base plate toward the electrode assembly, wherein the connection plate is arranged between and in direct contact with both of the supporting protrusions, and wherein each supporting protrusion fixes the connection plate inside the supporting rib.

13. The battery of claim 12, wherein an outer surface of the supporting rib contacts the storage case.

14. The rechargeable battery of claim 6, wherein the groove is an opening in the supporting rib extending from the inner surface of the storage case and terminating between the inner surface of the storage case and the base plate, wherein the groove exposes a portion of the second tab.

15. The rechargeable battery of claim 7, wherein the fixing protrusions are laterally offset from the terminal.

* * * * *